United States Patent
Ramanzin

(10) Patent No.: US 6,724,820 B2
(45) Date of Patent: Apr. 20, 2004

(54) VIDEO CODING METHOD AND CORRESPONDING ENCODER

(75) Inventor: Yves R. Ramanzin, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 318 days.

(21) Appl. No.: 09/990,210

(22) Filed: Nov. 21, 2001

(65) Prior Publication Data

US 2002/0097800 A1 Jul. 25, 2002

(51) Int. Cl.[7] .................................................. H04B 1/66
(52) U.S. Cl. .......................... 375/240.12; 375/240.24; 375/240.13; 375/240.15; 375/240.16; 382/284; 382/236; 382/234; 382/238; 382/242
(58) Field of Search .................. 375/240.12, 240.24, 375/240.21, 240.13, 240.14, 240.15, 240.16, 240.23; 382/284, 234, 236, 238, 242, 243; 348/409, 420, 413, 402, 415

(56) References Cited

U.S. PATENT DOCUMENTS 6,043,838 A * 3/2000 Chen ............................ 348/42
6,205,260 B1 * 3/2001 Crinon et al. ............... 382/284

FOREIGN PATENT DOCUMENTS

| EP | 0753970 | 7/1996 | ............. H04N/7/26 |
| FR | 2784845 | 10/1998 | ............. H04N/7/12 |

OTHER PUBLICATIONS

Rob Koenen, "Overview of the MPEG–4 Version 1 Standard", International Organisaton for Standardisation Organisation Internationale D Normalisation, Oct., 1997, Fribourg, ISO/IEC JTC1/SC29.WG11.

* cited by examiner

*Primary Examiner*—Shawn S. An

(57) ABSTRACT

The MPEG-4 video standard includes a predictive coding scheme. When a scene-cut occurs in the sequence processed by said coding scheme, the first video object plane (VOP) which follows it is coded as an I-VOP, instead of predicting it from the previous VOP, completely different. In case of temporal scalability, when the scene-cut occurs between two VOPs of the enhancement layer, specific rules for selecting the temporal reference(s) during the prediction operations in said enhancement layer are defined.

4 Claims, 1 Drawing Sheet

VIDEO CODING METHOD AND CORRESPONDING ENCODER

FIELD OF THE INVENTION

The present invention generally relates to video compression, and more particularly to a video coding method applied to a video sequence and provided for use in a video encoder comprising base layer coding means, provided for receiving said video sequence and generating therefrom base layer signals that correspond to video objects (VOs) contained in the video frames of said sequence and constitute a first bitstream suitable for transmission at a base layer bit rate to a video decoder, and enhancement layer coding means, provided for receiving said video sequence and a decoded version of said base layer signals and generating therefrom enhancement layer signals associated with corresponding base layer signals and suitable for transmission at an enhancement layer bit rate to said video decoder. More precisely, it relates to a method allowing to code the VOs of said sequence and comprising the steps of:

(1) segmenting the video sequence into said VOs;
(2) coding successive video object planes (VOPs) of each of said VOs, said coding step itself comprising sub-steps of coding the texture and the shape of said VOPs, said texture coding sub-step itself comprising a first coding operation without prediction for the VOPs called intracoded or I-VOPs, coded without any temporal reference to another VOP, a second coding operation with a unidirectional prediction for the VOPs called predictive or P-VOPs, coded using only a past or a future I- or P-VOP as a temporal reference, and a third coding operation with a bidirectional prediction for the VOPs called bidirectional predictive or B-VOPs, coded using both past and future I- or P-VOPs as temporal references.

The invention also relates to computer executable process steps stored on a computer readable medium and provided for carrying out such a coding method, to a corresponding computer program product, and to a video encoder carrying out said method.

BACKGROUND OF THE INVENTION

In an encoder according to the MPEG-4 standard (said standard being described for instance in the document "Overview of the MPEG-4 Version 1 Standard", ISO/IEC JTC1/SC29/WG11 N1909, October 1997, Fribourg), three types of pictures are used :intra-coded (I) pictures, coded independently from other pictures, predictively-coded (P) pictures, predicted from a past reference picture (I or P) by motion compensated prediction, and bidirectionally predictively-coded (B) pictures, predicted from a past and a future reference picture (I or P). The I pictures are the most important, since they are reference pictures and can provide access points (in the bitstream) where decoding can begin without any reference to previous pictures (in such pictures, only the spatial redundancy is eliminated). By reducing both spatial and temporal redundancy, P-pictures offer a better compression compared to I-pictures which reduce only the spatial redundancy. B-pictures offer the highest degree of compression.

In MPEG-4, several structures are used, for example the video objects (VOs), which are entities that a user is allowed to access and manipulate, and the video object planes (VOPs), which are instances of a video object at a given time. In an encoded bitstream, different types of VOPs can be found: intra coded VOPs, using only spatial redundancy (the most expensive in terms of bits), predictive coded VOPs, using motion estimation and compensation from a past reference VOP, and bidirectionally predictive coded VOPs, using motion estimation and compensation from past and future reference VOPs.

For P-VOPs and B-VOPs, only the difference between the current VOP and its reference VOP(s) is coded. Only P- and B-VOPs are concerned by the motion estimation, carried out according to the so-called "Block Matching Algorithm": for each macroblock of the current frame, the macroblock which matches the best in the reference VOP is sought in a predetermined search zone, and a motion vector MV is then calculated. The resemblance criterion is given by the Sum of Absolute Differences (SAD). For a N×N macroblock, SAD is expressed as:

$$SAD = \sum_{i=0}^{N \times N} |A(i) - B(i)|$$

Thus the chosen macroblock is the one corresponding to the smallest SAD among those calculated in the search zone. For said estimation, different modes exist, depending on the type of the frame:

(a) for P-VOPs macroblocks, only the "forward mode" (use of a past reference I-VOP or P-VOP) is available;
(b) for B-VOPs macroblocks, four modes are available for the macroblock estimation:
  "forward mode" (as for P-VOPs);
  "backward mode": as the forward mode, except that the reference is no longer a past one but a future P- or I-VOP;
  "interpolated mode" or "bidirectional mode": it combines the forward and backward modes and uses a past and a future reference VOP;
  "direct mode": each motion vector is calculated thanks to the motion vector of the future reference VOP and thanks to the temporal distance between the different VOPs.

Within MPEG-4, an important functionality, the scalability, is offered. Scalable coding, also known as "layered coding", allows to generate a coded representation in a manner that enables a scalable decoding operation. Scalability is the property of a bitstream to allow decoding of appropriate subsets of data leading to the generation of complete pictures of resolution and/or quality that commensurate with the proportion of the bitstream decoded. Such a functionality is useful in the numerous applications that require video sequences to be simultaneously available at a variety of resolutions and/or quality and/or complexity. Indeed, if a bitstream is scalable, one user will access only a portion of it to provide basic video in accordance with his own decoder or display, or with the available bandwidth, while another one will use the full bitstream to produce a better video quality.

The advantage of scalability, which costs less in terms of coding process than the solution according to which several independent bitstreams are coded, is that it allows to deliver a bitstream separable into at least two different bitstreams (and, among them, one with a higher bitrate than the others). Each type of scalability therefore involves more than one layer. In the case of temporal scalability, at least two layers consisting of a lower layer and a higher layer are considered. The lower layer is referred to as the base layer, encoded at a given frame rate, and the additional layer is called the enhancement layer, encoded to provide the information missing in the base layer (in order to form a video signal with a higher frame rate) and thus to provide a higher temporal resolution at the display side. A decoder may decode only the base layer, which corresponds to the minimum amount of data required to decode the video stream, or also decode the enhancement layer (in addition to the base layer), said enhancement layer corresponding to the additional data required to provide an enhanced video signal, and then output more frames per second if a higher resolution is required.

As said above, the MPEG-4 video standard includes a predictive coding scheme. When a scene-cut occurs, it is therefore much more efficient to code the first VOP which immediately follows said scene-cut as an I-VOP, instead of trying to predict it from the preceding VOP, which is completely different from it. In case of temporal scalability, the problem is more complex, since the scene-cut may occur between two VOPs of the enhancement layer and it has still to be handled in the base layer. If the first VOP is coded as an I-VOP on each layer, this leads to a waste of bits and to a loss of coding efficiency.

SUMMARY OF THE INVENTION

It is therefore an object of the invention to propose a coding method allowing to reduce said loss of coding efficiency in the scene-cut situations.

To this end, the invention relates to a coding method such as defined in the introductory part of the description and which is moreover characterized in that the temporal references of the enhancement layer VOPs are selected, when a scene cut occurs and said enhancement layer VOPs are located between the last base layer VOP of a scene and the first base layer VOP of the following scene, according to the following specific processing rules:
(A) VOPs located before the scene cut:
  (a) no constraint is applied to the coding type;
  (b) the use of the next VOP in display order of the base layer as a temporal reference is forbidden;
(B) the VOP located just immediately after the scene cut:
  (a) P coding time is enforced;
  (b) the next VOP in display order of the base layer is used as a temporal reference;
(C) other VOPs located after the scene cut:
  (a) no constraint is applied to the coding type;
  (b) the use of the previous VOP in display order of the base layer as a temporal reference is forbidden.

The main advantage of this solution is that it allows to encode only one intra VOP while avoiding non efficient inter-scene predictions.

The invention also relates to computer executable process steps stored on a computer readable medium and provided for carrying out such a video coding method, and to a computer program product comprising a set of instructions, which, when loaded into an encoder as described, causes it to carry out the steps of this method. It also relates to a video encoder comprising base layer coding means, receiving a video sequence and generating therefrom base layer signals that correspond to video objects (VOs) contained in the video frames of said sequence and constitute a first bitstream suitable for transmission at a base layer bit rate to a video decoder, and enhancement layer coding means, receiving said video sequence and a decoded version of said base layer signals and generating therefrom enhancement layer signals associated with corresponding base layer signals and suitable for transmission at an enhancement layer bit rate to said video decoder, said video encoder comprising:

(1) means for segmenting the video sequence into said VOs;
(2) means for coding the texture and the shape of successive video object planes (VOPs), the texture coding means performing a first coding operation without prediction for the VOPs called intracoded or I-VOPs, coded without any temporal reference to another VOP, a second coding operation with a unidirectional prediction for the VOPs called predictive or P-VOPs, coded using only a past or a future I- or P-VOP as a temporal reference, and a third coding operation with a bidirectional prediction for the VOPs called bidirectional predictive or B-VOPs, coded using both past and future I- or P-VOPs as temporal references, characterized in that the temporal references of the enhancement layer VOPs are selected, when a scene cut occurs and said enhancement layer VOPs are located between the last base layer VOP of a scene and the first base layer VOP of the following scene, according to the following specific processing rules:
(A) VOPs located before the scene cut:
  (a) no constraint is applied to the coding type;
  (b) the use of the next VOP in display order of the base layer as a temporal reference is forbidden;
(B) the VOP located just immediately after the scene cut:
  (a) P coding time is enforced;
  (b) the next VOP in display order of the base layer is used as a temporal reference;
(C) other VOPs located after the scene cut:
  (a) no constraint is applied to the coding type;
  (b) the use of the previous VOP in display order of the base layer as a temporal reference is forbidden.

BRIEF DESCRIPTION OF THE DRAWINGS

The invention will now be described in a more detailed manner, with reference to the accompanying drawings in which.

DETAILED DESCRIPTION OF THE INVENTION

Figure 1:
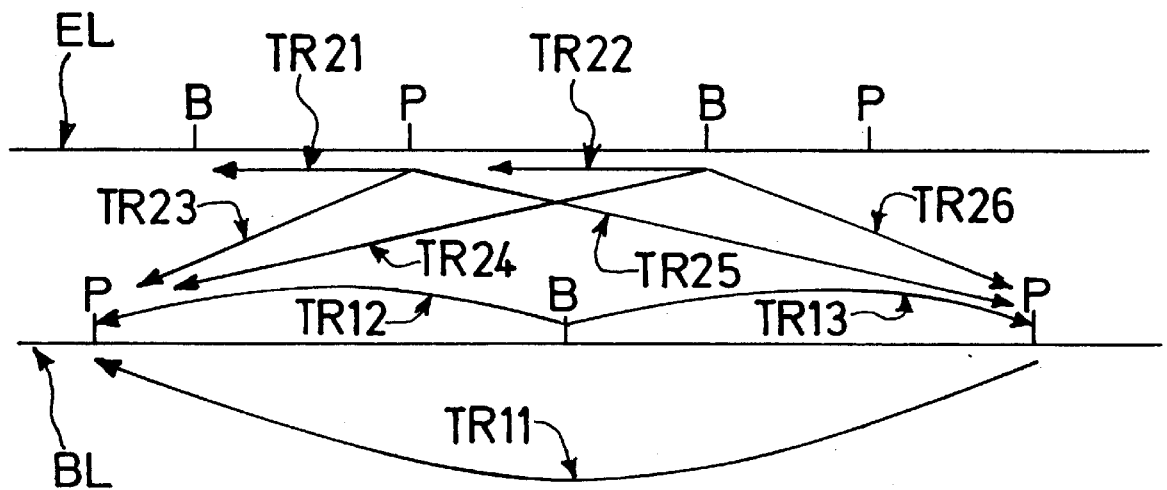
FIG. 1 illustrates the selection of the temporal references in the base and enhancement layers of a scalable MPEG-4 video stream.

As said above, in an encoded bitstream, different types of VOPs can be found: intra coded VOPs, predictive coded VOPs and bidirectionally predictive coded VOPs. As the MPEG-4 video standard is a predictive coding scheme, temporal references have to be defined for each coded non-intra VOP. In the single layer case or in the base layer (BL) of a scalable stream, temporal references are defined by the standard in a unique way, as illustrated in FIG. 1 (TR11, TR12, TR13). On the contrary, for the temporal enhancement layer (EL) of an MPEG-4 stream, three VOPs can be taken as a possible temporal reference for the motion prediction: the most recently decoded VOP (TR21, TR22) of the enhancement layer, or the previous VOP (TR23, TR24) of the base layer (in display order), or the next VOP (TR25, TR26) of the base layer (in display order). These three possible choices are illustrated in FIG. 1 for a P-VOP and a B-VOP of the temporal enhancement layer (each arrow corresponds to a possible temporal reference): one reference has to be selected for each P-VOP of the enhancement layer and two for each of its B-VOP.

Figure 2:
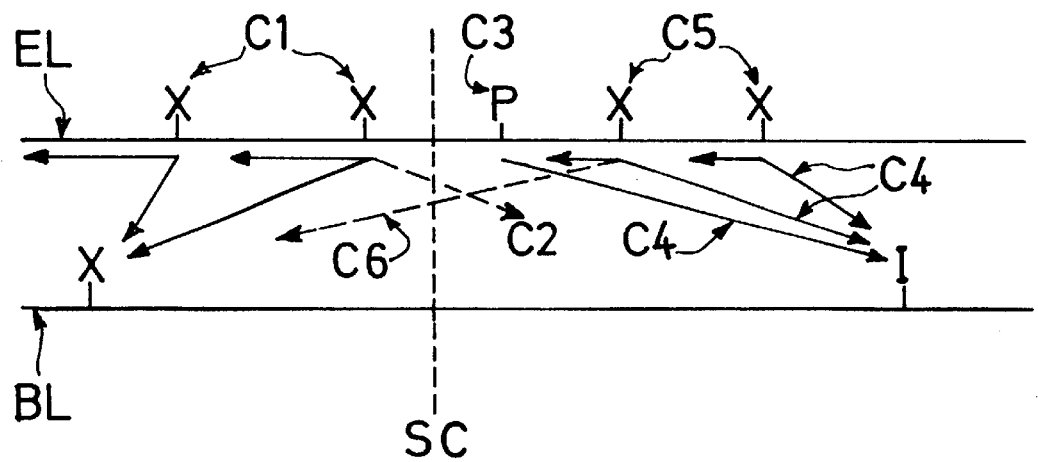
FIG. 2 illustrates the specific rules defined for said selection process of the temporal references according to the invention.

The invention is now explained in relation with FIG. 2. Theoritically, in order to fulfil compression efficiency constraints, only one I-VOP per scene change is needed. As there is no possible choice of temporal reference in the base layer, it is decided to code as an I-VOP the first VOP of the base layer after the scene-cut (said scene cut is referenced SC in FIG. 2), and, in the enhancement layer, to forbid both intra coding and prediction inter-scene, specifically for all enhancement VOPs located between the last base layer VOP of a scene and the first base layer VOP of the following scene. These coding rules are therefore the following ones:

(1) VOPs located before the scene cut: (a) condition C1: no constraint is applied to the coding type, and (b) condition C2: the use of the next VOP in display order of the base layer as a temporal reference is forbidden;

(2) the VOP located just immediately after the scene cut: (a) condition C3: P coding type is enforced, and (b) condition C4: said P coding uses the next VOP in display order of the base layer as a temporal reference;

(3) other VOPs located after the scene cut: (a) condition C5: no constraint is applied to the coding type, and (b) condition C6: the use of the previous VOP in display order of the base layer as a temporal reference is forbidden.

The six conditions associated to these three situations are illustrated in FIG. 2, where X corresponds to a VOP of whatever coding type. By comparing FIGS. 1 and 2, it is clearly seen that the conditions C2, i.e. no use of a next VOP for a VOP located before the scene-cut, C4, i.e. the next VOP of the base layer as a temporal reference, and C6, i.e no previous VOP of the base layer as a temporal reference, are satisfied.

The video coding method thus described is then carried out by means of a video encoder comprising on one hand base layer coding means, that receive a video sequence and generate therefrom base layer signals that correspond to video objects (VOs) contained in the video frames of said sequence and constitute a first bitstream suitable for transmission at a base layer bit rate to a video decoder, and on the other hand enhancement layer coding means, that receive said video sequence and a decoded version of said base layer signals and generate therefrom enhancement layer signals associated with corresponding base layer signals and suitable for transmission at an enhancement layer bit rate to said video decoder. This encoder comprises means for segmenting the video sequence into said VOs and means for coding the texture and the shape of successive video object planes (VOPs) of each of said VOs, and the texture coding means perform three types of coding operations: a first one without prediction for the VOPs called intracoded or I-VOPs, a second one with a unidirectional prediction for the VOPs called predictive or P-VOPs, and a third one with a bidirectional prediction for the VOPs called bidirectional predictive or B-VOPs.

According to the invention, in said encoder, when a scene cut occurs and said enhancement layer VOPs are located between the last base layer VOP of a scene and the first base layer VOP of the following scene, the temporal references of the enhancement layer VOPs are selected according to the processing rules defined above:

(A) VOPs located before the scene cut: no constraint is applied to the coding type, and the use of the next VOP of the base layer as a temporal reference is forbidden;

(B) the VOP located just immediately after the scene cut: P coding time is enforced, and the next VOP of the base layer is used as a temporal reference;

(C) other VOPs located after the scene cut: no constraint is applied to the coding type, and the use of the previous VOP of the base layer as a temporal reference is forbidden.

It must be understood that the video encoder described hereinabove can be implemented in hardware or software, or by means of a combination of hardware and software. It may then be implemented by any type of computer system—or other apparatus adapted for carrying out the described method. A typical combination of hardware and software could be a general-purpose computer system with a computer program that, when loaded and executed, controls the computer system such that it carries out the method described herein. Alternatively, a specific use computer, containing specialized hardware for carrying out one or more of the functional tasks of the invention, could be utilized. The present invention can also be embedded in a computer program medium or product, which comprises all the features enabling the implementation of the method and functions described herein, and which—when loaded in a computer system—is able to carry out these method and functions. The invention also relates to the computer executable process steps stored on such a computer readable medium or product and provided for carrying out the described video coding method. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation, and/or (b) reproduction in a different material form.

The foregoing description of the invention has been presented for purposes of illustration and description, and is not intended to be exhaustive or to limit the invention to the precise form disclosed, and variations are possible in light of the above teachings. Such variations that are apparent to a person skilled in the art are intended to be included within the scope of the invention.

What is claimed is:

1. For use in a video encoder comprising base layer coding means, provided for receiving a video sequence and generating therefrom base layer signals that correspond to video objects (VOs) contained in the video frames of said sequence and constitute a first bitstream suitable for transmission at a base layer bit rate to a video decoder, and enhancement layer coding means, provided for receiving said video sequence and a decoded version of said base layer signals and generating therefrom enhancement layer signals associated with corresponding base layer signals and suitable for transmission at an enhancement layer bit rate to said video decoder, a video coding method applied to said sequence and comprising the steps of:

(1) segmenting the video sequence into said VOs;

(2) coding successive video object planes (VOPs) of each of said VOs, said coding step itself comprising sub-steps of coding the texture and the shape of said VOPs, said texture coding sub-step itself comprising a first coding operation without prediction for the VOPs called intracoded or I-VOPs, coded without any temporal reference to another VOP, a second coding operation with a unidirectional prediction for the VOPs called predictive or P-VOPs, coded using only a past or a future I- or P-VOP as a temporal reference, and a third coding operation with a bidirectional prediction for the VOPs called bidirectional predictive or B-VOPs, coded using both past and future I- or P-VOPs as temporal references, the temporal references of the enhancement layer VOPs being selected, when a scene cut occurs and said enhancement layer VOPs are located between the last base layer VOP of a scene and the first base layer VOP of the following scene, according to the following specific processing rules:

(A) VOPs located before the scene cut:
  (a) no constraint is applied to the coding type;
  (b) the use of the next VOP in display order of the base layer as a temporal reference is forbidden;
(B) the VOP located just immediately after the scene cut:
  (a) P coding time is enforced;
  (b) the next VOP in display order of the base layer is used as a temporal reference;
(C) other VOPs located after the scene cut:
  (a) no constraint is applied to the coding type;
  (b) the use of the previous VOP in display order of the base layer as a temporal reference is forbidden.

2. Computer executable process steps stored on a computer readable medium and provided for carrying out a video coding method according to claim 1.

3. A computer program product for a video encoder for carrying out in said encoder the coding method according to claim 1, which product comprises a set of instructions which, when loaded into said encoder, causes it to carry out the steps of said method.

4. A video encoder comprising base layer coding means, receiving a video sequence and generating therefrom base layer signals that correspond to video objects (VOs) contained in the video frames of said sequence and constitute a first bitstream suitable for transmission at a base layer bit rate to a video decoder, and enhancement layer coding means, provided for receiving said video sequence and a decoded version of said base layer signals and generating therefrom enhancement layer signals associated with corresponding base layer signals and suitable for transmission at an enhancement layer bit rate to said video decoder, said video encoder comprising:

(1) means for segmenting the video sequence into said VOs;
(2) means for coding the texture and the shape of successive video object planes (VOPs), the texture coding means performing a first coding operation without prediction for the VOPs called intracoded or I-VOPs, coded without any temporal reference to another VOP, a second coding operation with a unidirectional prediction for the VOPs called predictive or P-VOPs, coded using only a past or a future I- or P-VOP as a temporal reference, and a third coding operation with a bidirectional prediction for the VOPs called bidirectional predictive or B-VOPs, coded using both past and future I- or P-VOPs as temporal references, characterized in that the temporal references of the enhancement layer VOPs are selected, when a scene cut occurs and said enhancement layer VOPs are located between the last base layer VOP of a scene and the first base layer VOP of the following scene, according to the following specific processing rules:

(A) VOPs located before the scene cut:
  (a) no constraint is applied to the coding type;
  (b) the use of the next VOP in display order of the base layer as a temporal reference is forbidden;
(B) the VOP located just immediately after the scene cut:
  (a) P coding time is enforced;
  (b) the next VOP in display order of the base layer is used as a temporal reference;
(C) other VOPs located after the scene cut:
  (a) no constraint is applied to the coding type;
  (b) the use of the previous VOP in display order of the base layer as a temporal reference is forbidden.

* * * * *